Sept. 25, 1945.        C. D. TRIPP        2,385,390
LOCK NUT
Filed July 28, 1944        3 Sheets-Sheet 1
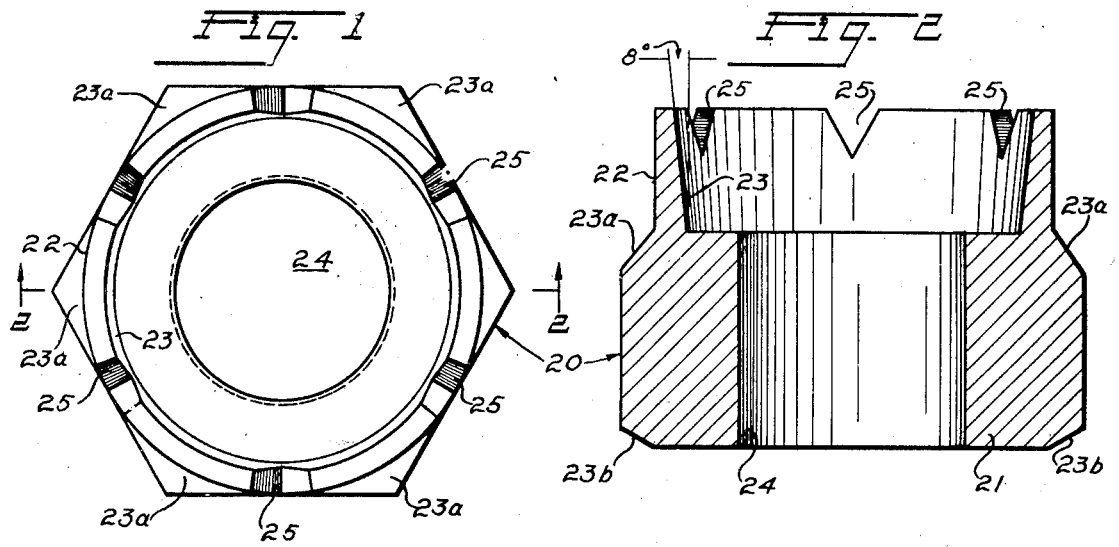
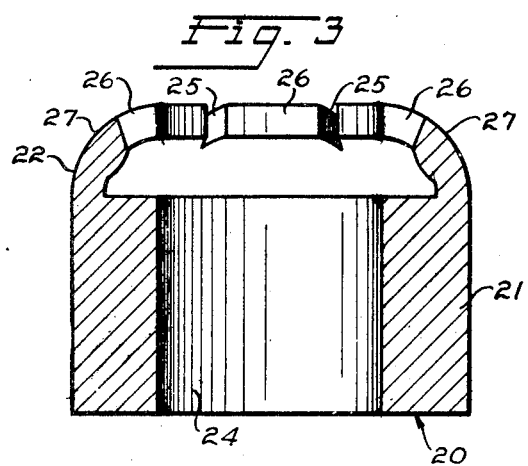
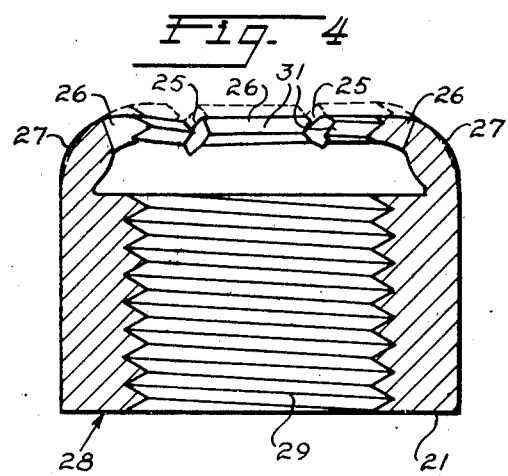
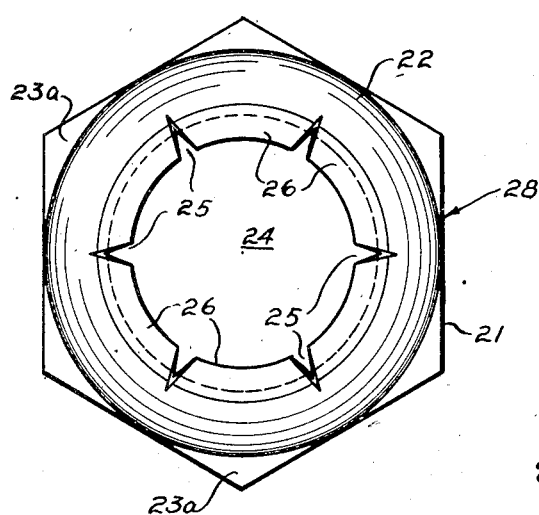
Inventor
CHESTER D. TRIPP
By Strauch & Hoffman
Attorneys Sept. 25, 1945. C. D. TRIPP 2,385,390
LOCK NUT
Filed July 28, 1944 3 Sheets-Sheet 2

Inventor
CHESTER D. TRIPP
By Strauch & Hoffman
Attorneys

Sept. 25, 1945.  C. D. TRIPP  2,385,390
LOCK NUT
Filed July 28, 1944   3 Sheets-Sheet 3
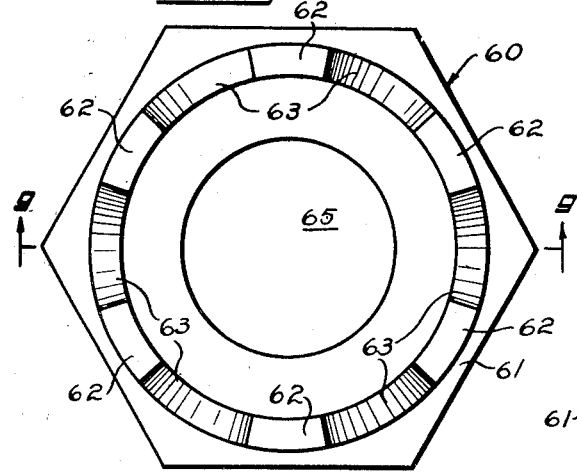
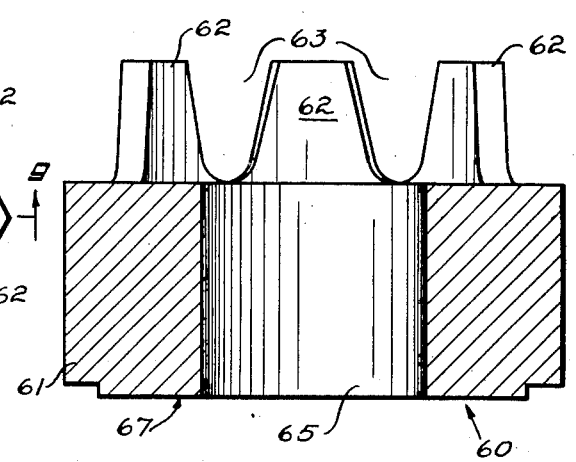
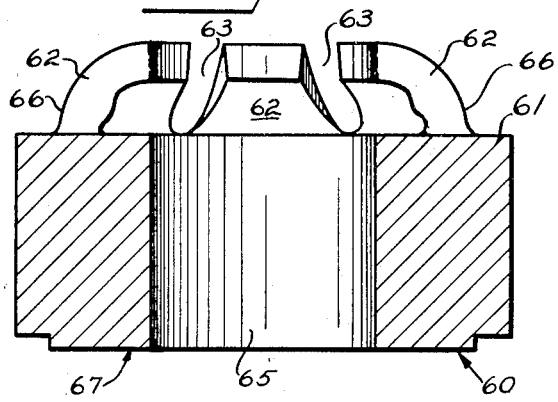
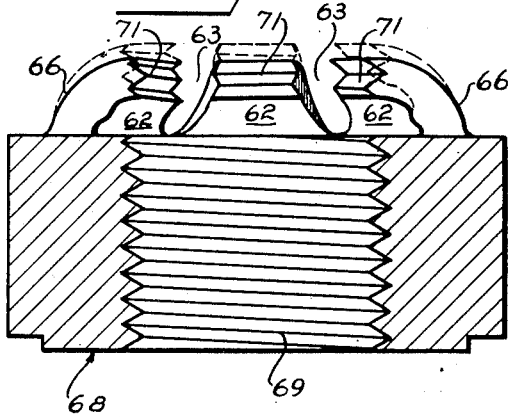
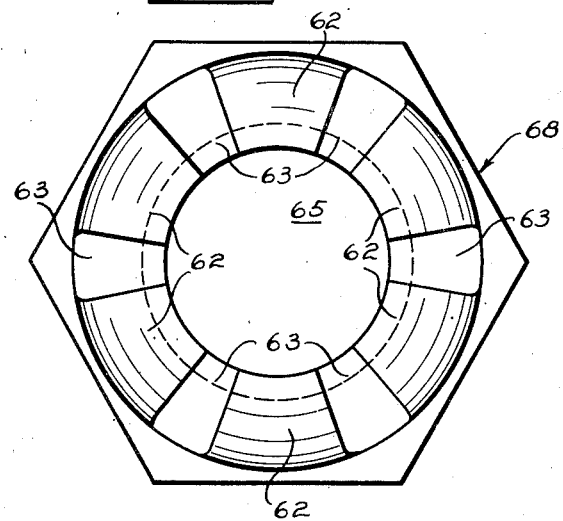
Inventor
CHESTER D. TRIPP
By Strauch & Hoffman
Attorneys Patented Sept. 25, 1945

2,385,390

UNITED STATES PATENT OFFICE 2,385,390

LOCK NUT

Chester D. Tripp, Chicago, Ill.

Application July 28, 1944, Serial No. 546,953

10 Claims. (Cl. 151—21)

The present invention relates to improvements in lock nuts of the frictional grip type. More particularly this invention relates to lock nuts in which the frictional grip or locking characteristics are imparted by controlled deflection or distortion of part of the nut threads.

In my United States Patent No. 2,352,668, issued July 4, 1944, I have disclosed an improved lock nut and method of producing the same by indenting a face of a standard type of nut with spaced shallow indentations of rapidly increasing surface areas under controlled maximum pressures to modify the helix angles of adjacent threads of the nut without substantially distorting the diameter of the threaded hole, thereby imparting novel controllable and highly useful locking characteristics to such nuts not previously attained by any prior method of nut indentation. Because of reliance substantially entirely upon thread helix distortion in these patented nuts to secure the grip on the mating threaded members, this type of lock nut is best adapted for relatively coarse thread nuts, which if unhardened should preferably be used on unhardened bolts, studs, or mating threaded members. This is due primarily to the fact that to secure the desirable commercial grips more deformation must be imparted to the thread helices than is commercially desirable or practical on fine threads. Unless these nuts are hardened or the mating threads are sufficiently soft to deflect somewhat as the nut is applied, the nut deflections or deformations are reamed or ironed out by hardened mating threads. Accordingly, while the nuts of said patent are decided improvements over other prior deflected or indented nuts in both the coarse and fine thread fields, their application is undesirably limited from a commercial and production viewpoint to the coarse thread field, or soft nuts for use on hardened bolts, and/or for nuts having relatively heavy frictional grips.

The method of producing the indentations disclosed in said Patent No. 2,352,668, by control of maximum indenting pressures correlated with rapidly increasing shallow areas of indentation, also a marked improvement over prior indenting and deformation methods, is further substantially improved by the present invention by increasing the pressures of indentation to a predetermined maximum as the area of indentation or extent of deflection increases, thereby providing even closer control of the nut grip both in the forms of nuts disclosed in said patent, and in the improved nut forms hereinafter disclosed.

In general, the improved nuts of the present invention comprise main body sections, in which the load carrying threads are formed, and extensions having relatively resilient, angularly separated, threaded sections axially spaced from the body threads and subjected to controlled multiple deflections and distortions so that the extensions and locking thread sections are subjected to multiple stresses when the nuts are applied to the mating thread members, without, however, subjecting them to internal stresses and strains which will cause them to lose desirable locking or gripping characteristics even after repeated applications of relatively soft or unhardened nuts on hardened or relatively fine mating threads.

While nuts having threaded resilient extensions provided with locking thread portions deflected out of phase or pitch or transversely to reduce the diameter have been proposed, as for example in British Patent No. 1,649 of 1903, and in United States Patent No. 2,320,785, such nuts do not incorporate the controlled multiple deflections and deformations of the nuts of the present invention, differ in essential features of structure, mode of operation, and controlled lock or grip results and, so far as I am aware, have not been commercially successful.

Primary objects of the present invention, therefore, are to provide improved frictional lock nuts having resiliently supported locking thread sections deflected or deformed in a multiplicity of directions with respect to the main load carrying threads of the nut in such manner that a multiplicity of locking or gripping effects on the mating thread members are secured and combined within the elastic limits of the deflected resilient sections, and a novel method of producing the same.

Further, more detailed objects of the invention will appear to those skilled in the art from the foregoing discussion, from the following disclosures of preferred specific embodiments, and from the appended claims.

Referring to the drawings:

Figure 1 is a plan view on a greatly enlarged scale of a hexagonal nut blank for use in forming a preferred form of nut embodying my invention;

Figure 2 is a sectional view taken along line 2—2 of Figure 1;

Figure 3 is a sectional view similar to Figure 2 showing the blank of Figures 1 and 2 with the resilient locking thread sections curved inward;

Figure 4 is a sectional view similar to Figure 2 showing in full lines the final threaded nut after deflection, and in dotted lines, the position of the resilient locking thread sections after threading but prior to deflection;

Figure 5 is a plan view of the completed nut of Figure 4;

Figure 6 is a sectional view showing a preferred form of die utilized to produce the locking deflections;

Figures 8 to 12 are views similar to Figures 1 to 5, showing a modified form of nut embodying my invention.

Figure 8:
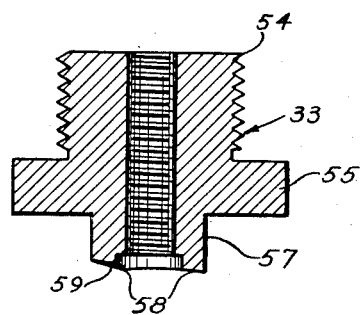

With continued reference to the drawings, wherein like reference numerals are employed to designate the same parts throughout the various views, numeral 20 indicates a nut blank having a shape designed particularly for manufacture on a nut forming machine. Blank 20 comprises a body portion 21 having an hexagonal, square or any other suitable outline, an annular axially extending tapering skirt 22 having an axially extending outer wall and an interior wall 23 sloping inwardly to its juncture with body 21. At the upper corners 23a, the metal of the nut body joining skirt 22 slopes at an angle of approximately sixty degrees to the horizontal and the lower corners 23b are chamfered at an angle of approximately thirty degrees as shown in Figure 2. Body portion 21 is provided with a central bore 24, preferably coaxial with skirt 22 and of a diameter to permit immediate threading using a threading tap of appropriate size.

Blank 20 may be formed from any suitable bar or wire stock having a slight elasticity, such as medium carbon or alloy steel, certain aluminum alloys, bronze, or the like, and may be made to any desired dimensions. As a specific example, a suitable blank 20 for a one-half inch nut may be made up from standard hex bar, steel stock to provide a nut body 21, measuring seventy-five (.75) hundredths of an inch across the flats and having a height of three hundred seventy-five (.375) thousandths of an inch, a skirt 22 having a length of twenty-five (.25) hundredths of an inch preferably fifty-seven (.057) thousandths of an inch thick at its free end with its inner wall 23a tapering inwardly at its junction with body 21 at an angle of approximately eight degrees, and a bore finish bored to three hundred seventy-five (.375) thousandths of an inch to leave a wall thickness of one hundred eighty-seven (.187) thousandths of an inch at the flats. It is to be understood that the thickness of skirt 22 may be varied as desired depending upon the extent of grip desired, the nature of the stock, size of the nut, the radius of curvature, and can be varied to meet a wide range of commercial requirements in combination with the number of deflections and the deflection pressures employed.

Such a blank is then subjected to suitable operations by use of dies or otherwise to turn the skirt 22 inwardly through an angle not exceeding and preferably slightly less than ninety degrees, and to crimp it to form diametrically disposed indentations or scallops 25 separating skirt 22 into angularly spaced, inwardly directed tangs 26 extending inwardly from a continuous annular line of bend 27 as shown in Figure 3. In this position, the inner edges of tangs 26 are disposed in substantial alignment with bore 24.

As a consequence, each tang 26 provides a resilient, radially inwardly extending portion adapted to flex in a substantially axial direction along the plane of bend 27. As clearly seen in Figure 3, the metal at each indentation 25 and opposite bend 27 bulges inwardly due to the crimping and bending operations. This thickened metal increases the resiliency of the metal along and adjacent to the line of bend 27 and assures sufficient strength to resist a permanent set of tangs 26 when the finished nut is threaded on a mating threaded element.

With the blank in this form, a combined reaming and threading tap (not shown) is inserted in bore 24 from the bottom face of the blank and is operated to cut threads in the bore. This combined reaming and tapping tool also passes between the inwardly facing scalloped edges of tangs 26, reaming the edges back to the finished diameter of bore 24 and threading the edges of tangs 26 to provide axially spaced threads in phase with the threads of bore 24. The final dimensions of the edges of tangs 26 are shown in dotted lines on an exaggerated scale in Figure 3 for purposes of illustration.

This operation provides a threaded nut 28, Figures 4 and 5, having a main threaded load carrying section 29 and an axially spaced, auxiliary threaded section 31 formed by the inner ends of resilient tangs 26. Threaded nut 28 exhibits no locking characteristics but is in condition to have locking characteristics imparted to it by the novel method of my invention.

It is to be understood, that threaded nut 28 as shown in Figures 4 and 5 may be formed in any other suitable manner without departing from the spirit of this invention. The preceding description is intended merely as an example of the preferred manner of forming the nut to be operated upon by my novel method of providing locking characteristics and, as the dimensions of different sizes of nuts may be proportionally increased, or decreased using the given dimensions as a basis, it will be understood that these proportions are not necessarily critical.

Figure 7:
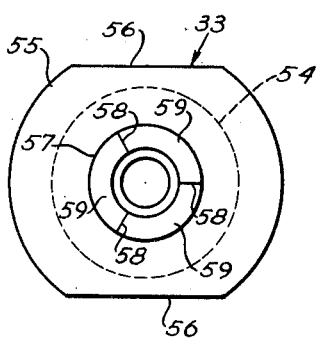
Figure 7 is a bottom plan view of the die of Figure 5.

Nut 28 is fed to any suitable device for carrying out my novel lock nut forming method which consists in deforming one or more of the resilient tangs 26 so as to dispose the thread carried thereby in out-of-phase relation to threaded section 29 while at the same time axially depressing a corner of one or more of the tangs toward the body of the nut and imparting a slight radially inward movement to the entire tang by bending it along bend 27. This deformation of the tang or tangs 26 is of the order of a few thousandths of an inch only, possibly one (.001) thousandth of an inch on a fine thread three-eighths inch nut and is accomplished by a die 33 preferably formed as shown in Figures 6 and 7.

Figure 13:
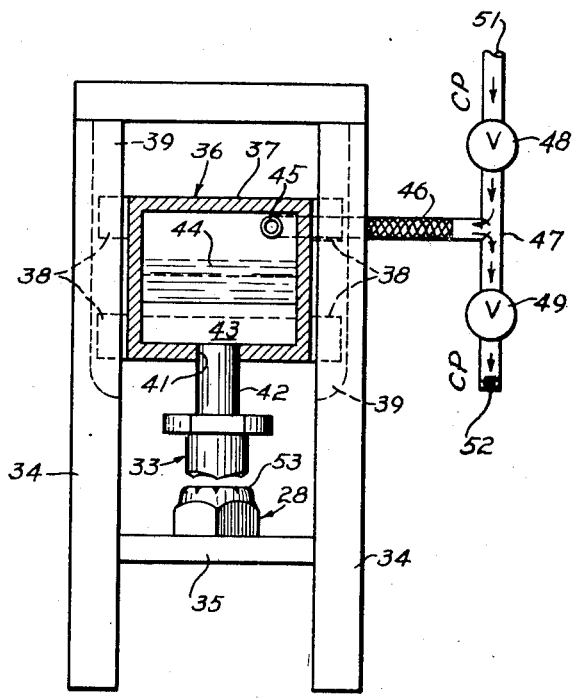
Figure 13 is a diagrammatic view of one form of apparatus capable of carrying out the method of the present invention.

While this deforming operation may be accomplished in any suitable manner so long as accurate control of the deforming force and the resulting deformation is obtained, a suitable apparatus for accomplishing the deforming operation is illustrated in Figure 13. Referring to Figure 13, a suitable supporting structure comprising upright legs 34 supporting a rigid nut receiving table or platform 35 and a vertically movable piston and cylinder assembly 36 is provided.

Assembly 36 comprises a cylinder 37 having outwardly extending guides 38 slidably received in vertical guideways 39 of legs 34. The lower surface of cylinder 37 is centrally apertured at 41 to slidably receive a piston rod 42 suitably associated with a piston 43 operatively associated with cylinder 37. Any suitable packing means (not shown) may be provided for aperture 41 to prevent fluid leakage around rod 42 and piston 43 is suitably constructed to provide the proper sliding seal with the interior of cylinder 37. Die 33 is carried by the lower end of rod 32 in position to engage nut 28 supported on table 35.

A suitable quantity of liquid 44, preferably oil is placed in cylinder 37 above piston 43. The quantity of liquid is selected so the liquid level will lie below port 45 in cylinder 37 when piston 43 is in its uppermost position, shown by dotted lines in Figure 13, to prevent escape of liquid through port 45 during operation. Port 45 may be used for supplying the liquid in cylinder 37 although its primary purpose is to connect flexible tubing 46, adapted to supply compressed air to the area of cylinder 37 above the liquid, to cylinder 37.

Tubing 46 is suitably connected to a rigid line 47 containing a constant pressure inlet valve 48 and a constant pressure outlet or relief valve 49. Inlet valve 48 is connected through pipe 51 to a suitable source of compressed air, such as a compressed air tank (not shown), and outlet valve 49 is provided with a connection 52 which may open into the atmosphere or be connected by a suitable return pipe (not shown) to the source of compressed air. Valves 48 and 49 are both adjustable to predetermine the inlet or minimum pressure and the outlet or maximum pressure applied to the surface of liquid 44. While these pressures may vary widely depending upon the nature of the nut stock, the degree of lock required, and the number of tangs 26 deflected, the specific one-half inch nut previously described can be provided with a one hundred pound torque pressure as determined by a Riehle testing machine with an inlet pressure of eighty pounds and an outlet pressure of one hundred forty-one pounds on a piston diameter of six inches. Such a nut will retain its gripping force within a ten per cent variation even after many applications to even hardened bolts. The machine disclosed forms no part of the present invention, is disclosed for illustrative purposes only, and is separately claimed.

While die 33 may assume any suitable form designed to engage the face 53 of nut 28 at angularly spaced points, it preferably takes the form shown in Figures 4 and 5.

As seen in these figures, die 33 comprises a threaded shank 54 adapted to be screw threadedly engaged in the lower end of rod 42, a flange portion 55 having diametrically opposed flaps 56, and an axially extending, concentric annular portion 57. The lower end of portion 57 is ground to provide one or more inwardly and axially extending crests 58 illustrated in the drawings as three in number joined by surfaces 59 ground at an angle of approximately ten degrees to a horizontal plane passing through the crests. This die forms no part of the present invention, since any suitably shaped die may be employed, and a more detailed description may be obtained from my co-pending application Serial No. 545,290, filed July 17, 1944, wherein this die is fully described and claimed.

In practicing my novel method of deflecting a nut, any suitable standard nut, such as that shown in my Patent No. 2,352,668 prior to deflection, or nut 28 of this application, may be used. Assuming nut 28 is used in the apparatus of Figure 13, it is placed on a table or platform 35 and die 33 is moved toward the table along a path coaxial with the nut axis until it contacts the upper face 53 of the nut. Cylinder 37 is then moved to the end of its downward stroke forcing die 33 into deflecting contact with the nut under an initial pressure determined by inlet valve 48. This pressure builds up as cylinder 37 moves downward and the space above piston 43 is decreased by relative movement of cylinder 37 and piston 43, to the maximum pressure predetermined by relief valve 49, and is maintained until cylinder 37, on its return movement, picks up piston 43.

When this maximum pressure is reached, valve 49 opens and by-passes the air in cylinder 37 and line 46 to the atmosphere or returns it to the compressed air tank. With this apparatus it will be seen that movement of cylinder 37 may be continued to the full length of its stroke without disturbing the maximum pressure on die 33. As a consequence, any suitable means having a stroke sufficiently long to assure a suitable clearance between piston 43 and cylinder 37 may be employed for moving piston and cylinder assembly 36.

In event a nut such as that shown in my Patent 2,352,668 is being indented by die 33, the die will press into the face of the nut only to the extent permitted by the maximum pressure and the depth and area of indentation, and the resulting depth and area of deformation of the helix angle of the thread will be predetermined as disclosed in my said patent but within closer limits, due to the increase of pressure as the area of indentation increases and to the pressure regulation provided by this apparatus.

Assuming that nut 28 is being operated upon by my novel method and die 33 having crests at three points spaced approximately one hundred and twenty degrees apart in an angular direction, and the nut position is preferably such that the die crests are positioned midway between adjacent tangs, the particular tangs 26 engaged by the inclined plane surfaces of the die will undergo downward arcuate movement around the line of bend 27 and the threaded ends will move slightly, radially inward. Also, since the pressure of the die is confined to the area adjacent crests 58, this downward pressure will twist or tilt the tang ends transversely of their major axis, adjacent tang ends being oppositely tilted. The threaded sections of the ends of the engaged tangs will, due to the tilts imparted in opposite directions, assume helix angles slightly at a variance with each other and with the normal helix angle originally imparted by the combined reaming and tapping tool. As a result the engaged tangs undergo at least a three-way deformation with respect to the nut body, namely, axially transversely inward, and circumferentially to dispose one edge of each tang in a different horizontal plane from its opposite edge thereby imparting different helix angle modifications to the thread section of adjacent tangs.

This multiple dimensional deformation provides desirable gripping force of a nut on both coarse thread and fine thread nuts and may be varied within wide limits by varying the dimensions of the tangs, material of the nut and extent of the deflections without substantial deformation beyond the elastic limit of the metal of the nut when applied to a mating threaded member. Furthermore, it will be clear that the resistance of the tangs to bodily movement and twisting in multiple directions combine to grip the mating thread member giving a wide range of commercially desirable grips not procurable in any other known type of lock nut without the need of sufficient deformation in any direction when applied to the mating thread member to stress the deflected nut metal beyond its elastic limit in any direction. This multiple deflection of tangs 26, due to the very slight individual deformations, makes it possible to avoid injury to the mating bolt threads, an objection to all known previous grip nuts, which require a substantial deformation of one form or another to secure the desired locking grip. Therefore, the re-use of my improved lock nut upon the same bolt is made possible.

By accurately controlling and limiting the difference in phase relationship and helix angle of the threads on the tangs with respect to the load bearing threads of the nut, no practically observable mutilation of the bolt threads occurs while obtaining a gripping pressure sufficiently effective to prevent axial movement of the nut on the bolt except by the application of a high turning torque to the nut. This is due to the fact that, as the nut is threaded on the bolt and the threads of the tangs engage with the bolt threads, each of the tangs is torsionally stressed to establish, circumferentially of the nut, closely spaced pressure zones in each of which frictional pressure is exerted by the thread on one of the tangs in relatively opposite axial directions against the adjacent threads on the bolt. Thus, gripping pressures on the bolt threads are substantially uniformly distributed circumferentially thereof to securely lock the nut in its adjusted position against axial movement in either direction on the bolt. It will also be evident that since the torsional stressing of the tangs is very slight, the deleterious effects of fatigue will be negligible so that there will be no noticeable decrease in locking effectiveness even after prolonged use and many threading and unthreading operations of the nut.

It, accordingly, will be appreciated that the present nuts have a much wider field of application than the nuts of my Patent No. 2,352,668 particularly for fine thread light grip applications, and, as far as is known, nuts formed in substantially this manner are the only soft metal nuts capable of repeated use on heat treated or hardened bolts with relatively slight loss of gripping capacity or injury to the nuts or mating bolt threads.

In Figures 8 to 12, I have disclosed another form of nut embodying my present invention made from a nut blank having a contour adapting it for manufacture on a screw machine. Referring to Figures 8 to 10, a nut blank 60 comprising a body portion 61 having an hexagonal, square or any other desirable contour, a plurality of axially extending protuberances or tangs 62 of uniform thickness separated by diametrically opposite relieved or cut out portions 63 and having parallel axial walls 64 and a central bore 65 is provided. Preferably tangs 62 are concentrically arranged with respect to the axis of bore 65 and are formed as shown in the drawings, although a satisfactory coarse thread nut may be produced from a blank made on a nut former and having three solid protuberances extending from the bore to three corners of the nut. Such a nut is in effect a variation of the nut of this form of this invention and forms the subject matter of a further application.

The blank is formed of any suitable bar or wire stock such as soft steel, brass or the like. As in the previous form of the invention, bore 65 is finish bored to the desired final diameter and, except for the complete independence of tangs 62 and the absence of a taper, the nut dimensions may be substantially identical to those previously given for nut 28.

Blank 60 is subjected to a suitable folding, spinning or peening operation to turn the ends of tangs 62 through an angle of approximately ninety degrees, preferably slightly less, to the position shown in Figure 10. In this position, the inner ends of tangs 62 are disposed in substantial alignment with the bore 65 and provide substantially radially, inwardly extending portions angularly spaced by the relief or cut-out portions 63. Therefore, each tang 62 provides a resilient, radially inwardly extending member adapted to flex in a substantially axial direction along the plane of bend 66, which as clearly shown in Figure 10 bulges inwardly due to the bending operation.

With the blank in this form, a combined reaming and threading tap (not shown) is inserted in bore 65 from face 67 of the blank and is operated to cut threads in the bore and pass between the inwardly facing ends of tangs 62 cutting the edge back to the finished diameter of bore 65 and threading the edges of the tangs to provide axially spaced threads in phase with the threads of bore 65. The final dimensions of the ends of tangs 62 are shown in dotted lines on an exaggerated scale in Figure 10 for purposes of illustration.

This operation provides a threaded nut 68, Figures 11 and 12, having a main threaded section 69 and an axially spaced, auxiliary threaded section 71 formed by the inner ends of resilient tangs 62. Threaded nut 68, like threaded nut 28, exhibits no locking characteristics but is in condition to have locking characteristics imparted to it by the novel method of my invention heretofore described.

It is to be understood that nut 68, as shown in Figures 11 and 12, may be formed in any other suitable manner without departing from the spirit of this invention and the preceding description is intended merely as an example of a preferred manner of forming the nut to be operated upon by my novel method. Nut 68 is adapted to any suitable device for carrying out my novel lock nut forming method in the manner previously described in connection with nut 28. In this connection, the apparatus of Figure 13 and die 33 may be used in exactly the same way previously described in connection with nut 28.

Assuming that nut 68 has been operated upon by apparatus of Figure 13 in the manner previously described, each tang 62 undergoes downward arcuate movement around the line of bend 66 and the threaded ends will move slightly, radially inward. The tangs 62 also will be twisted or tilted circumferentially of the nut transversely of their major axis to modify the helix angle as heretofore pointed out. As a consequence, these nuts will exhibit the same locking characteristics as those previously described and are disclosed merely to show a possible variation within the scope of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A lock nut comprising a threaded body; a resilient tang supported from said body; and a threaded end face on said tang spaced from said body; the thread on said end face differing in pitch diameter, helix angle, and phase relationship from the thread on said body.

2. A lock nut comprising a threaded body; a plurality of resilient tangs supported from said body; and threaded end faces on said tangs spaced from said body; the thread on a plurality of said end faces differing in pitch diameter, helix angle, and phase relationship from the thread on said body.

3. A lock nut comprising a threaded body; a plurality of resilient tangs supported from said body; and threaded end faces on said tangs spaced from said body; the threads on at least one pair of adjacent end faces being reversely deflected axially of said nut with relation to each other and to the thread on said body.

4. A lock nut having a threaded body and angularly spaced, inwardly directed tangs threaded along their inwardly directed faces and disposed in axially spaced relation to said body, one or more of said tangs being bent toward said body and radially inward to modify the helix angle of its thread section and to dispose its thread section in axial out-of-phase relation to and radially inwardly of the threads of said body.

5. A lock nut having a body internally threaded to provide a main threaded section and axially and inwardly directed, angularly spaced, threaded tangs providing angularly interrupted, axially spaced, auxiliary threaded sections, one or more of which has a helix angle different from the helix angle of said main threaded section and the other auxiliary threaded sections and is disposed in axial out-of-phase relation to and radially inward of the threads of said main threaded section and said other auxiliary threaded sections.

6. A lock nut comprising a body internally threaded to provide a main load-carrying thread section; and an axially spaced resilient thread section deflected along angularly spaced areas to provide a thread helix angle therein reversed with respect to the load carrying threads and adapted to resiliently grip a mating thread section.

7. A lock nut comprising a threaded body having an auxiliary threaded section axially spaced from one end of the body and disposed in out-of-phase relation to the threads of said body and having adjacent thread areas oppositely inclined.

8. The lock nut defined in claim 7 wherein the auxiliary threaded section comprises angularly spaced threaded tangs, the pitch diameter of which is slightly less than the pitch diameter of the threads of said body.

9. A lock nut comprising a body having a threaded bore; a substantially right angularly bent tang supported by said body with its end face concentric with and disposed slightly inwardly of said threaded bore; and a partial thread in said end face disposed in out-of-phase relation to the threads of said bore and having a helix angle different from the threads of said bore.

10. The lock nut defined in claim 9 wherein the helix angle of said partial thread is reversed with respect to the helix angle of said body threads.

CHESTER D. TRIPP.